June 25, 1946.　　　C. V. FOULDS　　　2,402,544
HIGH VOLTAGE CURRENT INDICATING AND INSULATING MEANS
Filed March 15, 1943
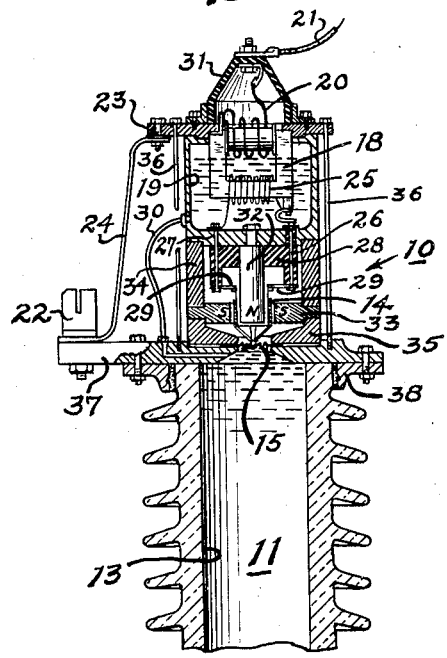
Fig. 1.
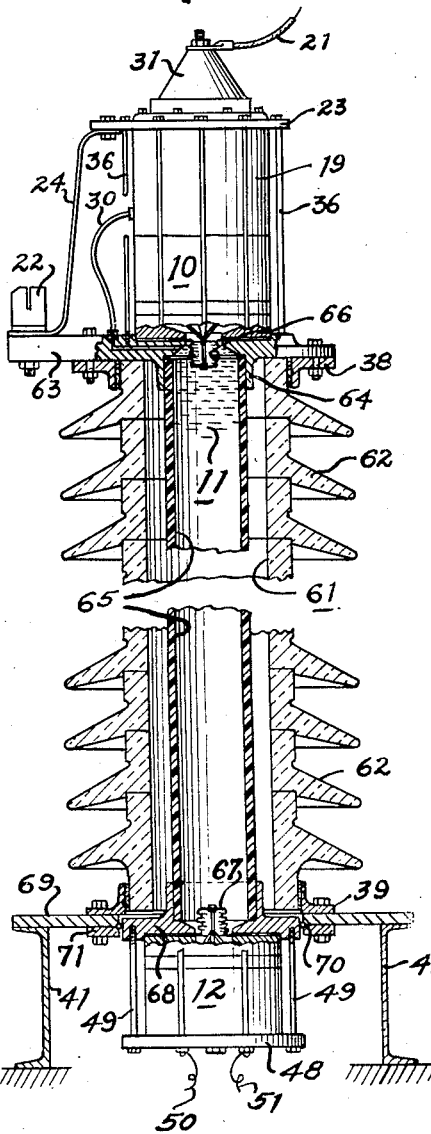
Fig. 2.
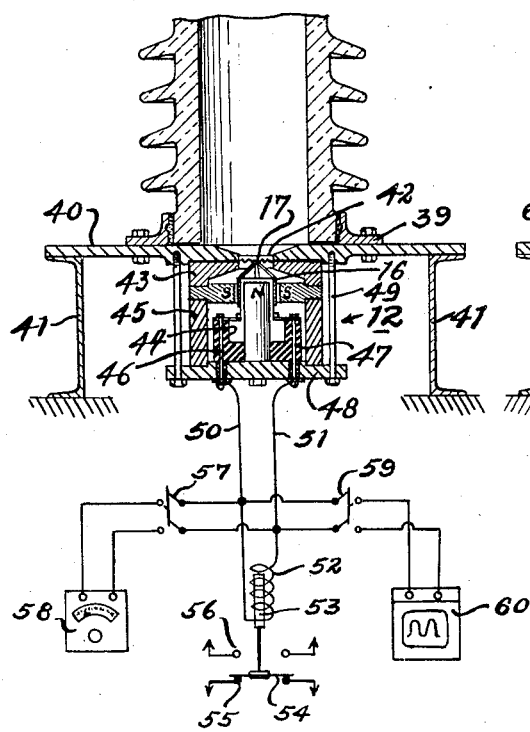
INVENTOR.
Charles V. Foulds.
BY
Wm. H. Atkinson
ATTORNEY.

Patented June 25, 1946

2,402,544

UNITED STATES PATENT OFFICE 2,402,544

HIGH VOLTAGE CURRENT INDICATING AND INSULATING MEANS

Charles V. Foulds, Berkeley, Calif., assignor to Pacific Electric Manufacturing Corporation, San Francisco, Calif., a corporation of California Application March 15, 1943, Serial No. 479,222

4 Claims. (Cl. 177—351)

My present invention relates to a means for transmitting a measure of the characteristics of a current flowing in a circuit at one potential to another circuit at a different potential, and more particularly to an insulating mechanical current characteristic transmitting means in which mechanical motion produced in the zone of a high potential circuit is transmitted through an insulating medium to a mechanical motion responsive means that will reproduce at a lower potential a comparable measure of the current in the high potential circuit for more convenient use with an associated low voltage control circuit, or as an indication of the characteristics of the current in the high potential circuit.

The principal object of the invention is to provide a means by which a measure of the characteristics of a current in a high potential circuit may be transmitted in an insulated manner to an isolated position, either for use with meters to indicate the value of the high potential line current, or for the purpose of operating relays and like devices.

Another object of the invention is to provide an insulated mechanical connection between two mechanical units operating at widely different potentials and in which one unit is responsive to current conditions at one of said potentials and another unit is adapted to reproduce, at a different potential, a current value having characteristics comparable to the current at said first potential.

Another object of the invention is to provide a novel insulating electromechanical means by which a measure of the phase, frequency and amplitude of a current flowing in a circuit at high potential may be transmitted in an insulated and safe manner to a zone of lower potential.

In the art to which this invention relates, and particularly with the higher potentials now being employed in power transmission circuits, the matter of obtaining a measure of the current in such high potential transmission line circuits has become a problem. At the present time reliance is generally had to transformers which provide an insulated inductive coupling between the high potential power line circuit and the control circuit which is customarily associated with the automatic switching equipment. With these arrangements it has been the practice to mount a current transformer in the insulating bushings that are provided as a support for the terminals of a circuit breaker or like apparatus. However, due to recent trends, and particularly to the developments in the so-called "minimum oil" and "air blast" circuit breakers, the use of high potential insulating bushings have become unnecessary. And further, due to the high potentials involved, the cost of an independent transformer makes its use prohibitive, as the transformer must still be provided with large insulating bushings and an oil insulated tank for its windings. Therefore, other means for effecting a control connection between a high potential transmission line circuit and a control circuit at a lower or ground voltage is now in demand to meet this condition.

In accordance with the present invention, and as distinguished from the prior art practices, the present arrangement contemplates the employment of a mechanical motion or vibration producing means which will operate in the zone of high potential in a manner characteristic of the current conditions in the high potential circuit, and the mechanical motion or vibration thus produced is transmitted in a mechanical manner through an insulating medium to a similar mechanical motion or vibration responsive current generating means which is capable of reproducing at a lower voltage a current having characteristics that are comparable to the corresponding characteristics of a current flowing in the high potential circuit. This latter current can then be employed to operate metering or indicating apparatus and/or to control relays for opening or closing a circuit or circuits in an associated control system.

For a better understanding of the invention, reference should now be had to the accompanying drawing, wherein there is shown by way of illustration and not of limitation preferred embodiments thereof.

In the drawing:

Figure 1 is a vertical, sectional view showing a preferred form of the invention, together with a schematic diagram indicating possible applications thereof, and Figure 2 is a vertical view with parts broken away and in section to illustrate a modified form of the invention.

Before proceeding with a detailed description of the apparatus chosen for the purpose of illustrating the present invention, it is believed that an understanding thereof will be facilitated by making brief reference to two examples of the prior art illustrating arrangements for effecting an insulated control connection between a high potential power line circuit and a lower voltage control circuit. One of the earliest known attempts to this end is believed to be illustrated by Patent No. 975,420, issued November 15, 1910, to F. W. Harris. In this disclosure the inventor has mounted the overload responsive tripping relay of a circuit breaker upon a suitable insulating support and in the zone of high potential closely adjacent the transmission line circuit, and then mechanically connected this overload tripping relay through a relatively long insulating rod or bar to a tripping mechanism located in a zone at ground potential and which serves to effect an opening of the circuit breaker.

A more recently proposed solution to the insulating problem contemplated by the present invention is illustrated by Patent No. 2,057,472, issued October 13, 1936, to E. R. Bonds. In accordance with this latter disclosure the inventor has appreciated the difficulties encountered in insulating the overload tripping relay located in a zone of high potential from a control circuit and tripping mechanism normally located in a zone of lower or ground potential. In this arrangement the mechanical connection used by Harris between the relay and the circuit breaker operating mechanism is eliminated by substituting a beam of light. As here proposed the circuit breaker tripping mechanism located and operating at ground potential is responsive to a photoelectrically controlled operating circuit in which a beam of light is reflected upon a photoelectric cell by means of a mirror or other reflecting surface, the position of which is controlled by an overload relay located in the zone of high potential. In this disclosure the overload relay is responsive only to the magnitude of the current flowing in the high potential circuit. While these arrangements provide an insulated connection for effecting the control of a tripping mechanism for a circuit breaker in the event of an overload on the circuit, they are not adapted to respond to any other characteristic of the high potential current and are, therefore, incapable of producing the results or operating in the manner contemplated by this invention.

Upon referring to Figure 1 of the drawing, it will be seen that the present invention, in its preferred form, comprises three major elements that are here illustrated as a compressional or sound wave generating unit 10 which is adapted to be connected to a high potential power line and generate compressional or sound waves characteristic of the current flowing in said power line, an insulating fluid medium 11 through which the compressional or sound waves generated by the unit 10 are propagated, and a compressional or sound wave responsive current generating unit 12 that is adapted to generate a low voltage current having characteristics comparable to the current of said high potential power line. The compressional or sound wave generating unit 10 is supported in a zone of high potential at the upper end of a hollow cylindrical insulator 13 where it can be conveniently connected to a power line circuit, and the compressional or sound wave responsive current generating unit 12 is mounted in a zone of low potential at the lower end of the hollow cylindrical insulator 13 where it can be conveniently connected to operate in association with a low voltage control or metering circuit. In this arrangement the hollow cylindrical insulator 13 also serves as a container for the insulating fluid medium 11 which forms the operating connection between the units 10 and 12. The compressional or sound wave generating unit 10 is here shown as of the so-called electrodynamic type having a permanent magnet field structure and a moving or operating coil 14 that is connected to operate a diaphragm 15 which is arranged to set up compressional or sound waves in the insulating fluid medium 11. Likewise, the compressional or sound wave responsive unit 12 is of the electrodynamic type having a permanent magnet field structure with a moving or voltage generating coil 16 that is arranged to be driven by a diaphragm 17 which is responsive to the compressional or sound waves transmitted through the insulating fluid medium 11 from the generating unit 10. The moving coil 14 of the compressional or sound wave generating unit 10 is preferably connected to the high potential circuit through a current transformer 18 that is here shown as located in a housing 19 formed immediately above the compressional or sound wave generating unit 10. The transformer 18 has its primary winding 20 connected in series with a power line conductor 21 and a terminal or clip 22 of an air break disconnecting switch (not shown), this circuit being completed through a conducting cover plate 23 at the top of the housing 19 and a jumper connection 24 which leads from the cover plate 23 to the terminal or clip 22 of the disconnecting switch. The terminals of the secondary winding 25 of the current transformer 18 are then brought down by two studs 26 and 27 that carry an insulating support 28 upon which the moving coil 14 of the generating unit 10 is mounted. And extending inwardly at the lower part of the insulating support 28 there are two flexible current conducting members 29 which complete a circuit to the moving coil 14. At this point it will be noted that the stud 26 is insulated at the point where it passes through the housing 19, and that the stud 27 is uninsulated and grounded upon the housing 19. In this particular showing it is assumed that the insulating medium is of a liquid character, as for example, transil oil, which can also be used to insulate the transformer 18. When such a fluid medium is used, it will be possible to maintain a constant volume of the fluid medium 11 between the diaphragms 15 and 17 by providing a capillary conduit connection 30 between the interior of the housing 19 and the space within the insulator 13 between the diaphragms 15 and 17. Such a conduit 30 has been found to permit a flow of the fluid medium 11 that will compensate for any expansion and contraction thereof due to temperature changes and, at the same time, it will operate as a closed valve against the transmission of any compressional waves. Therefore, the response of the diaphragm 17 to any compressional waves and/or motion set up in the fluid medium 11 by the diaphragm 15 will not be in any way affected by the presence of this conduit 30. The power line conductor 21 is shown as terminating upon an insulating cap 31 carried by the cover plate 23. Since the compressional or sound wave generating unit 10 is of the electrodynamic type, it is shown as having an annular air gap which is formed by an inner pole 32 and an outer annular pole 33. The air gap between the inner pole 32 and the outer annular pole 33 is magnetized by a permanent magnet field structure 34 which, with the base portion of the housing 19 previously referred to, completes the magnetic circuit. In this arrangement the transformer enclosing housing 19, the permanent magnet field structure 34 and the annular pole 33 are shown as held in clamped relation with each other and against a non-magnetic spacing block 35 by means of tie-rods 36 that pass through the cover plate 23 at the top of the housing 19 and are threaded into a top plate 37 at the upper end of the hollow cylindrical insulator 13. The non-magnetic spacing block 35 has a central opening which registers with a similar opening in the top plate 37, and the diaphragm 15 is here clamped at its rim between the non-magnetic spacing block 35 and the top plate 37 so as to provide a fluid-tight seal at this point. The top plate 37 is secured to the upper end of the hollow cylindrical insulator 13 by means of a flanged ring 38 that is cemented upon the insulator. Similarly, at its lower end the hollow cylindrical insulator 13 is cemented in a flanged ring 39 that is adapted to be secured upon a supporting plate 40 here shown as carried by channel iron supports 41. It will be understood that the supporting plate 40 may take any suitable form. For example, it may be the top of an apparatus enclosing housing, or it may be a portion of a transmission line supporting tower, or the like. This supporting plate 40 has a central opening 42 which, in conjunction with a similar opening in a non-magnetic spacing block 43, provides a space in which the diaphragm 17 of the compressional or sound wave responsive unit 12 is clamped, as in the case of the diaphragm 15. In this arrangement the moving coil 16 of the compressional or sound wave responsive unit 12 is movably secured within an annular air gap by means of an insulating support 44 which is secured in place within a permanent magnetic field structure 45 by means of current conducting studs 46 and 47 that pass through and are insulated from a clamping plate 48 which forms a part of the magnetic field structure 45. This field structure 45 is held together and in place by tie-rods 49 that are threaded into the underside of the supporting plate 40. The studs 46 and 47 provide exposed terminals extending from the moving coil 16 to which a controlled circuit may be connected. As here shown, the studs 46 and 47 are connected by conductors 50 and 51 to a solenoid 52 of a circuit controlling relay having an armature 53 that is adapted to move a contact bridging disc 54 with respect to either normally closed contacts 55 or normally opened contacts 56 so as to respectively open and/or close a control circuit. As an alternative, the conductors 50 and 51 may also be connected through a switch 57 or otherwise to an indicating ammeter or other current responsive measuring instrument 58 for a measurement of the power line current. And in a like manner these conductors 50 and 51 are shown as also adapted to be connected through a switch 59 to an oscillograph or oscilloscope 60 for a recordation or indication of the wave form of the current flowing in the power line circuit.

In the embodiment of the invention illustrated in Figure 2 of the drawing the compressional or sound wave generating unit 10 and the compressional or sound wave receiving unit 12 are of substantially the same general construction. The only material difference in the arrangement illustrated and that shown in Figure 1 is that the supporting insulator column, designated by the numeral 61, is formed of a plurality of stacked and individual insulating discs 62 that need not necessarily form a fluid-tight chamber. This insulator column 61 may also be formed of insulating units, such as are now generally provided with metallic bases and flanged caps that are secured together by bolts or other means. In this arrangement, due to the fact that the insulating discs 62 do not form a fluid-tight container, there is a top plate 63 that is provided with an inwardly disposed annular flange 64 in which a rigid tube of fibre or other insulating material 65 is secured to provide a container for the insulating compressional or sound wave transmitting fluid medium 11. Instead of the flat diaphragm 15, the compressional or sound wave generating unit 10 is here shown as operating upon a bellows-type of diaphragm 66, and the compressional or sound wave receiving unit 12 is adapted to be operated by a similar bellows-type of diaphragm 67 which is responsive to the compressional waves transmitted through the fluid medium 11 from the bellows 66. While the tube of insulating material 65 is described as rigid and composed of fibre or like insulating material, it will be understood that this member may be formed of other materials. For example, it is conceivable that a flexible hose having a comparatively rigid wall construction might be used should it be required to transmit the compressional waves from the diaphragm or bellows 66 to the diaphragm or bellows 67 in a direction which is not a straight line. In other words, since the compressional or sound waves set up in the fluid medium 11 are propagated in all directions, the two diaphragms, 15 and 17, or the bellows 66 and 67 may be disposed so as to operate along axes that are at an angle to each other. At its lower end and secured in sealing relation thereupon, the insulating tube 65 carries a closure plate 68 which is here shown as suspended within an enlarged aperture formed in a supporting plate 69 that is mounted upon the channel irons 41. In this arrangement the closure plate 68 is free to move relative to the supporting plate 69 and compensate for expansion and/or contraction of the fluid containing and insulating tube 65. A dust excluding and guide packing 70 is also shown as secured around the perimeter of the closure plate 68 by means of a clamping ring 71.

While the invention, as described above and shown in the drawing, contemplates a positioning of the compressional or sound wave generating unit 10 and the receiving unit 12 at opposite ends of a cylindrical insulator column with the compressional or sound wave insulating medium 11 located within the insulator column, it will be understood that where other insulating means are available, the compressional or sound wave generating and receiving units 10 and 12 may be located in other positions. For example, by the use of an insulating tube, such as the tube 65 shown in Figure 2, it will be possible to mount the generating and receiving units upon any suitable insulating support. It should also be understood that the present invention is not necessarily limited to the use of the so-called electrodynamic compressional or sound wave generating and receiving units. It is considered that any of the well known compressional or sound wave generating units and receiving units may be used to accomplish the objects of the invention. For example, any current responsive wave motion producing element, such as an electromagnetic, an electrostatic, or a magneto-strictive operating unit might be used to actuate the compressional or sound wave propagating diaphragm 15 or the bellows 66. And as for the receiving unit, it is conceivable that this device may also be of a like character. In some instances it is also considered that the output of the compressional or sound wave receiving unit 12 may be amplified in the well known manner.

Before describing further the operation of the arrangements of the present invention illustrated and described above, it is believed important to point out that while the present device, like the prior art devices, is adapted to operate in response to abnormal current conditions upon a high potential power line and thereby effect the operation of a circuit breaker or other apparatus through a circuit at ground potential, the present invention distinguishes over the disclosures of the above referred to prior art in that it has other and more important possibilities. For example, as has been suggested above, since the propagation of the compressional or sound waves generated by the unit 10 will be of a continuous nature, the present invention will provide a continuous response to other characteristics of the current flowing in the power line and, therefore, the present device may be used to measure power or to operate a frequency responsive device and/or an oscillograph or oscilloscope, as above suggested.

In the following description on the operation of the invention, reference will be had to Figure 1 of the drawing, it being understood, however, that the operation of the embodiment shown in Figure 2 will be of a substantially similar character. When the invention is used as shown with a high potential power line circuit, as represented by the conductor 21, it will be seen that the current in the conductor 21 will flow through the primary winding 20 of the transformer 18 and, as a result, the secondary winding 25 of the transformer 18 will provide an energizing current for the operating coil 14 of the compressional or sound wave generating unit 10 which will have a frequency, amplitude and wave form substantially similar to the power line current. Then, as the current thus provided flows through the operating coil 14 of the generating unit 10, the diaphragm 15 will be caused to operate and set up compressional waves in the fluid medium 11 which will correspond in frequency and amplitude to any variations in the current flowing in the power line 21. These compressional or sound waves will then be transmitted through the fluid medium 11 to the diaphragm 17 of the compressional or sound wave receiving unit 12 and, as a result, the current generating coil 16 of the receiving unit 12 will be caused to move in the magnetic field of its associated air gap and generate a current at a lower voltage having characteristics comparable to the corresponding characteristics of the power line current. As suggested above, the current output of the receiving unit 12 may then be used to operate a current or frequency responsive relay for the purpose of controlling an operating circuit in an electromagnetic control system, or it may be connected to any other suitable form of instrument for the purpose of indicating and/or recording the current conditions upon the power line conductor 21. In this particular application of the invention it has been found that by properly adjusting the mechanical resonance characteristics of the compressional or sound wave generating and responsive units 10 and 12, an increased response can be obtained in the compressional or sound wave receiving unit 12 and, under certain circumstances, it may be found desirable to thus increase the output of the receiving unit 12. This can be accomplished by loading one or both of the operating units 10 and 12 with springs and/or adding weight to their moving parts. Or, as an alternative, such a condition might be established by providing a limited amount of elasticity in the fluid column. The latter might be accomplished by providing a small flexible and resilient diaphragm or an adjustable spring biased bellows in the wall of the fluid column containing member, or at a point within the fluid column where the fluid might act thereupon and respond thereto. When the mechanical resonant characteristics of the compressional or sound wave generating and responsive units 10 and 12 are then properly adjusted, any constant difference in phase relation that might exist between the applied and received signals could be corrected by means of a conventional phase shifting device applied either to the transmitting or receiving end of the mechanical control connection thus established between the high potential power line circuit and the control or indicating circuit.

From the above it will be seen that the present invention provides a device by means of which an insulated operation controlling connection may be established between a high potential power line circuit and an operating circuit at a lower or ground potential and in which the functioning of the low potential operating circuit may be controlled in a continuous manner in response to any of a number of the variable characteristics of the current flowing in a high potential power line circuit.

While I have, for the sake of clearness and in order to disclose the invention so that the same can be readily understood, described and illustrated specific devices and arrangements, I desire to have it understood that this invention is not necessarily limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is:

1. In an insulating current characteristic transmitting connection for use with high voltage alternating current power line control circuits, the combination of a high voltage alternating current power line circuit, a compressional wave generating means responsive to current changes in said high voltage power line circuit, a compressional wave receiving means adapted to generate a current of lower voltage having electrical characteristics comparable in frequency and magnitude to the compressional waves received thereby, and a compressional wave propagating medium interposed between said compressional wave generating means and said compressional wave receiving means.

2. As a means for establishing an insulated current characteristic transmitting connection between a circuit at high potential and a control circuit at a lower potential, the combination of a high potenital circuit, an electrodynamic compressional wave generating unit having an operating coil energized by current from said high potential circuit, a hollow cylindrical insulating column adapted to support said electrodynamic compressional wave generating unit in the zone of said high potential circuit, a compressional wave generating diaphragm disposed in sealing relation over one end of said hollow cylindrical insulating column adapted to be driven by the operating coil of said electrodynamic compressional wave generating unit, a compressional wave receiving diaphragm mounted in sealing relation at the other end of said hollow cylindrical insulating column, an electrodynamic compressional wave receiving unit positioned exterior to and having a voltage generating coil driven by said latter diaphragm, and an insulating fluid medium completely filling said hollow cylindrical insulating column for transmitting the compressional waves generated by the diaphragm at said one end of said cylindrical insulating column to the compressional wave receiving diaphragm at the other end of said insulating column, whereby the voltage generating coil of said electrodynamic compressional wave receiving unit will generate an electric current having characteristics comparable to the corresponding characteristics of said high potential circuit.

3. As a means for establishing an insulated current characteristic transmitting connection between a circuit at high potential and a control circuit at a lower or ground potential, the combination of a high potential circuit, transformer means having a primary winding connected in said high potential circuit, a compressional wave generating unit having an operating coil energized from a secondary of said transformer means, a hollow cylindrical insulating column adapted to support said compressional wave generating unit and said transformer means in the zone of high potential adjacent said high potential circuit, a compressional wave generating diaphragm disposed in sealing relation over the upper end of said cylindrical insulating column adapted to be driven by the operating coil of said compressional wave generating unit, a compressional wave receiving diaphragm mounted in sealing relation at the lower end of said cylindrical insulating column, a compressional wave receiving unit positioned exterior to said latter diaphragm and having a voltage generating coil connected to be driven by said latter diaphragm, and a compressional wave transmitting fluid medium completely filling said hollow cylindrical insulating column for transmitting the compressional waves generated by the diaphragm at the top of said cylindrical insulating column to the compressional wave receiving diaphragm at the lower end of said insulating column, whereby the voltage generated in the coil of the compressional wave receiving unit will have characteristics comparable to the corresponding characteristics of said high potential circuit.

4. As a means for establishing an insulated current control connection between an alternating circuit at high potential and another circuit at a lower or ground potential, the combination of a high potential circuit, an electromagnetic compressional wave generating unit having an operating coil energized by current from said high potential circuit, a hollow cylindrical insulating column adapted to support said electromagnetic compressional wave generating unit in the zone of high potential adjacent said high potential circuit, a compressional wave generating diaphragm disposed at the upper end of said cylindrical insulating column adapted to be driven by the operating coil of said electromagnetic compressional wave generating unit, a compressional wave receiving diaphragm mounted at the lower end of said cylindrical insulating column, an electromagnetic compressional wave receiving unit positioned exterior to said latter diaphragm and having an operating coil connected to be driven by said latter diaphragm, and a fluid medium interposed between said first and said latter diaphragms for transmitting the compressional waves generated by the diaphragm at the top of said cylindrical insulating column to the compressional wave receiving diaphragm at the lower end of said insulating column, whereby a low voltage current will be generated in the operating coil of the electromagnetic compressional wave receiving unit that will have characteristics comparable to corresponding characteristics of the current in said high potential circuit.

CHARLES V. FOULDS.